(12) United States Patent
Lindenmeier et al.

(10) Patent No.: US 6,430,404 B1
(45) Date of Patent: Aug. 6, 2002

(54) SCANNING ANTENNA DIVERSITY SYSTEM FOR MOTOR VEHICLES

(75) Inventors: Heinz Lindenmeier, Planegg; Jochen Hopf, Haar; Leopold Reiter, Gilching, all of (DE)

(73) Assignee: Fuba Automotive GmbH & Co. KG, Bad Salzdetfurth (DE)

( * ) Notice: Subject to any disclaimer, the term of this patent is extended or adjusted under 35 U.S.C. 154(b) by 0 days.

(21) Appl. No.: 09/413,124

(22) Filed: Oct. 6, 1999

(30) Foreign Application Priority Data

Oct. 18, 1998 (DE) ......................................... 198 47 887

(51) Int. Cl.$^7$ ............................................... H04B 17/00
(52) U.S. Cl. .................. 455/132; 455/226.1; 455/277.2
(58) Field of Search ................................ 455/562, 522, 455/226.1, 272, 277.1, 277.2, 132, 161.1, 161.2, 161.3, 345; 375/347

(56) References Cited

U.S. PATENT DOCUMENTS

| | | | | |
|---|---|---|---|---|
| 5,826,179 A | * | 10/1998 | Lindenmeier et al. ... | 455/277.2 |
| 6,011,962 A | * | 1/2000 | Lindenmeier et al. ... | 455/226.1 |
| 6,169,888 B1 | * | 1/2001 | Lindenmeier et al. ... | 455/277.2 |
| 6,188,879 B1 | * | 2/2001 | Imamura .................. | 455/277.1 |
| 6,275,712 B1 | * | 8/2001 | Gray et al. .................. | 455/522 |
| 6,278,869 B1 | * | 8/2001 | Lindenmeier et al. ... | 455/277.1 |

* cited by examiner

Primary Examiner—Nay Maung
(74) Attorney, Agent, or Firm—Collard & Roe, P.C.

(57) ABSTRACT

A scanning antenna diversity system for motor vehicles having at least two antennas disposed in a multi-antenna installation. The diversity system also contains a controllable logic circuitry, and a receiver for receiving a signal from the antennas. Connected to the receiver is a diversity processor controlled by the receiver, for stepping the logic circuitry to another switching position during the presence of reception interference. This occurs during the shortest possible comparison times, which are initiated in cyclic repetition upon expiration of a longer time interval by level comparison circuitry for detecting signals. In this case, the level comparison circuitry determines a maximum level switching position associated with the greater actual received signal in an actual receive situation. Thus, the level comparison time is selected sufficiently short so that the reception is not audibly impaired by the level comparison time. In addition, the diversity processor is designed so that the received signals are cyclically switched through to the receiver and tested for freedom from interference. This testing determines and detects the maximum level switching position associated with the greater actual received signal in addition to discrete switching positions of the logic circuitry, when the received signals are switched through to the receiver.

14 Claims, 8 Drawing Sheets

SCANNING ANTENNA DIVERSITY SYSTEM FOR MOTOR VEHICLES

BACKGROUND OF THE INVENTION

1. Field of the Invention

The invention relates to a scanning diversity system for motor vehicles with a multi-antenna installation.

2. Description of the Prior Art

Circuit arrangements of this type are known in the prior art. For example, German Patent application DE 3517247 shows a diversity antenna designed to eliminate interferences with the reception of frequency-modulated (FM) radio broadcasts in the antenna. This diversity processor is for receiving a number of antenna signals which are switched through to the receiver at each point in time. A second signal is derived from this first signal in the receiver in the intermediate frequency range (IF) through transformation, and supplied to the diversity processor for the detection of interferences.

When interference in the system is detected, switching signals are derived in the diversity processor so that they switch to another antenna signal. Audio frequency interferences conditioned by multi-channel reception are then largely avoided so that the actual receive conditions are adequate. However, in regions where the reception conditions are poor, the circuit arrangement shown in German patent No. 3517247 are affected with frequently occurring changeover processes, such as interference caused by such stepped switching. In regions where the signals are weak, but the qualities of reproduction in the motor vehicle are good, the audio quality is impaired by these changeover interferences.

Frequency modulated (FM) signals such as an ultra-short wave (VHF) reception, or television audio receptions are subjected to reception interference while an antenna is switched on and operating. This is because of super positioning of a plurality of partial waves with varying differences in amplitude, phase and time delay in the location of reception. The breakdowns in level caused by these differences are correlated with upward peaks of frequency interference, and cause signal distortions depending on the content of modulation in the audio frequency range. Therefore, the minimum test time corresponds with the time in which the interference is detected. When interference is detected by the interference detector, the diversity processor induces further switching and tests the further signals and their linear combinations, if any, formed in the antenna matrix. If all available HF-signals show interferences, all HF-signals are continually switched through to the receiver successively. Since this search process is repeated in rapid sequence, any audible interference signal in the form of a crackling sound, superposes itself on the received signal at the low frequency (LF) level.

Therefore, German Patent DE 44003612 shows measures to limit the frequency of continued switching in regions where the reception is particularly unfavorable. This is shown through the use of a stop device. In cases where the diversity processor indicates that interference is occurring with excessive frequency, the stop device stops such continued switching with adaptation to the receive conditions. The interferences caused by change-over are in fact reduced by this measure. However, reception interferences indicated by the diversity processor are by nature reflected by effects of interference appearing in the receive signal.

SUMMARY OF THE INVENTION

Therefore, the object of the invention is to provide a scanning antenna diversity system by which continued switching is reduced and, as a consequence of such a reduction, interferences connected therewith are reduced as well.

The invention has the following advantages. First, the diversity processor selects the received signal supplying the highest level at any point in time. This availability is based on the preselection from the available received signals at any point in time, which means this received signal will consequently have interferences with lesser probability.

As a consequence, the benefits of the invention are that a received signal is selected wherein the probability of interference is less than the discrete signals, and the interference detection rate of a diversity processor is noticeably lower. On the other hand, it is known that extremely strong interferences may occur in FM radio broadcasting also in connection with large received signals. For example, the interferences are observed with multi-way reception where substantial differences exist with respect to time delay, or because of interferences in an adjacent or the same channel. Therefore, the diversity processor should also test the maximum level signal for freedom from interference, and in the affirmative, switches such a signal "on" a discreetly present signal.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar elements denote similar views.

DETAILED DESCRIPTION OF THE PREFERRED EMBODIMENT

Figure 1:
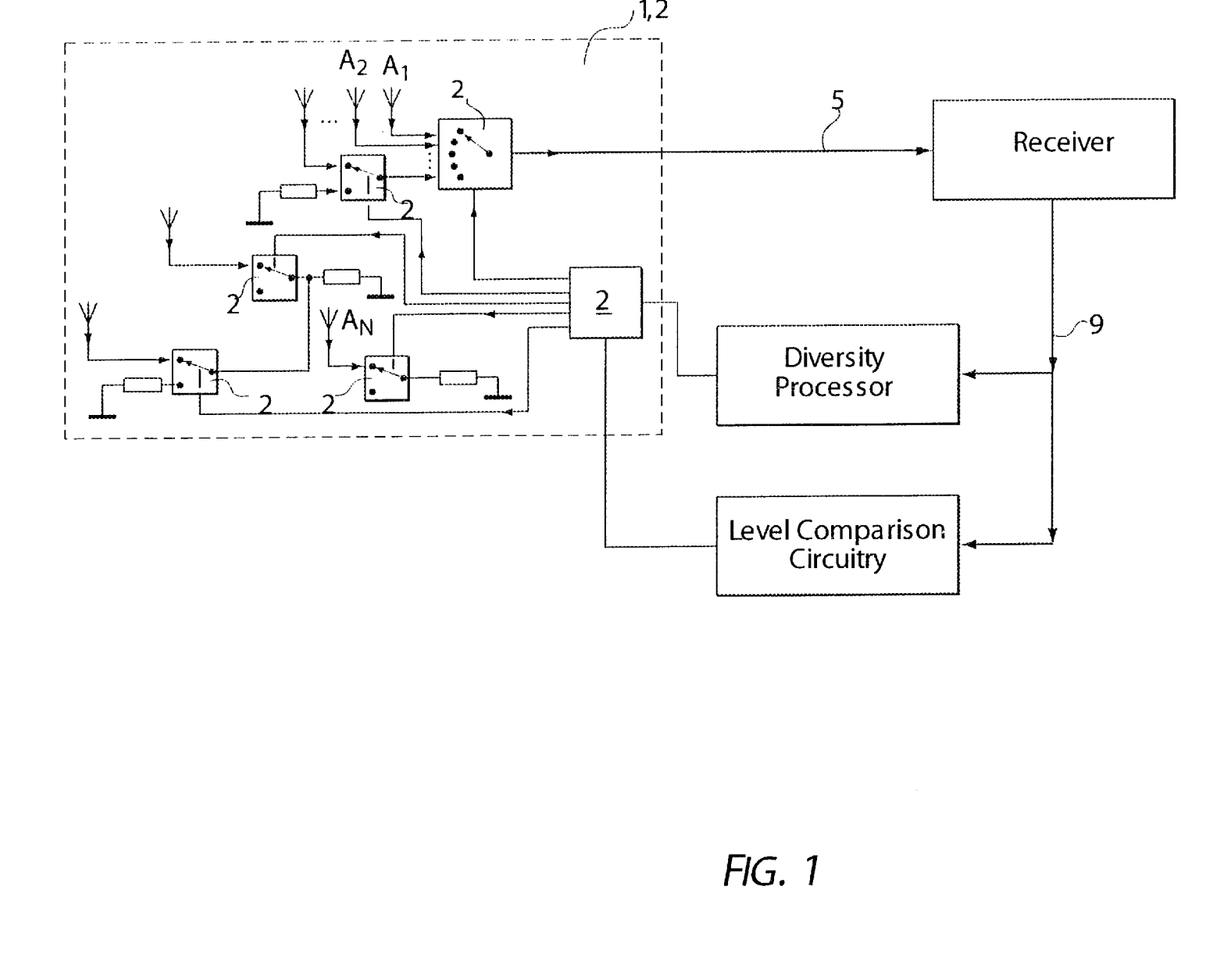
FIG. 1 is a scanning antenna diversity system according to the invention.

Referring to the drawings, FIG. 1 shows a scanning diversity system wherein there is a multi-antenna installation 1, coupled to a receiver 3, that is connected to both a diversity processor 4, and level comparison circuitry 8 for continually determining the maximum level switching position (Smax) corresponding with the maximum level in the derived received signal 9. The address of this maximum level switching position (Smax) is stored in logic circuitry 2, contained in the list of addresses, and acquired when received signals 5 are cyclically switched through to receiver 3.

The antennas (A1, A2 . . . An) with logic switching circuitry 2 are representative of almost any type of multi-antenna installation 1 which at any time supplies the receiver 3 with a received signal 5. Different discreetly available switching positions (S1, S2 . . . etc.) are known to result in different received signals 5, as known from German Patents DE 4403612 and DE 19607045. Different received signals can be formed by different wiring arrangements with the reactances of antenna components being coupled with each other electromagnetically, or as in FIG. 1 of German Patent DE 4403612 from linear combinations of antenna signals with the help of an antenna matrix 10 in the document. These type antenna diversity systems have an improvement in a received signal because receiver 3 is not overworked so that no multiple tuners or costly additional equipment is required. This advantage permits the formation of a great number of different received signals at low expenditure with the help of different switching positions S1, S2 etc..

Diversity processor 4 should have an extremely high speed interference detector. In the past, a processor of the type TEA 6101 was found to be extremely efficient for this purpose. The processor reacts to interference with an indication time of about 30 microseconds. This indication time is substantially determined by the IF bandwidth of receiver 3. Some forms of interference, result in significantly longer times for indicating an interference.

Figure 2:
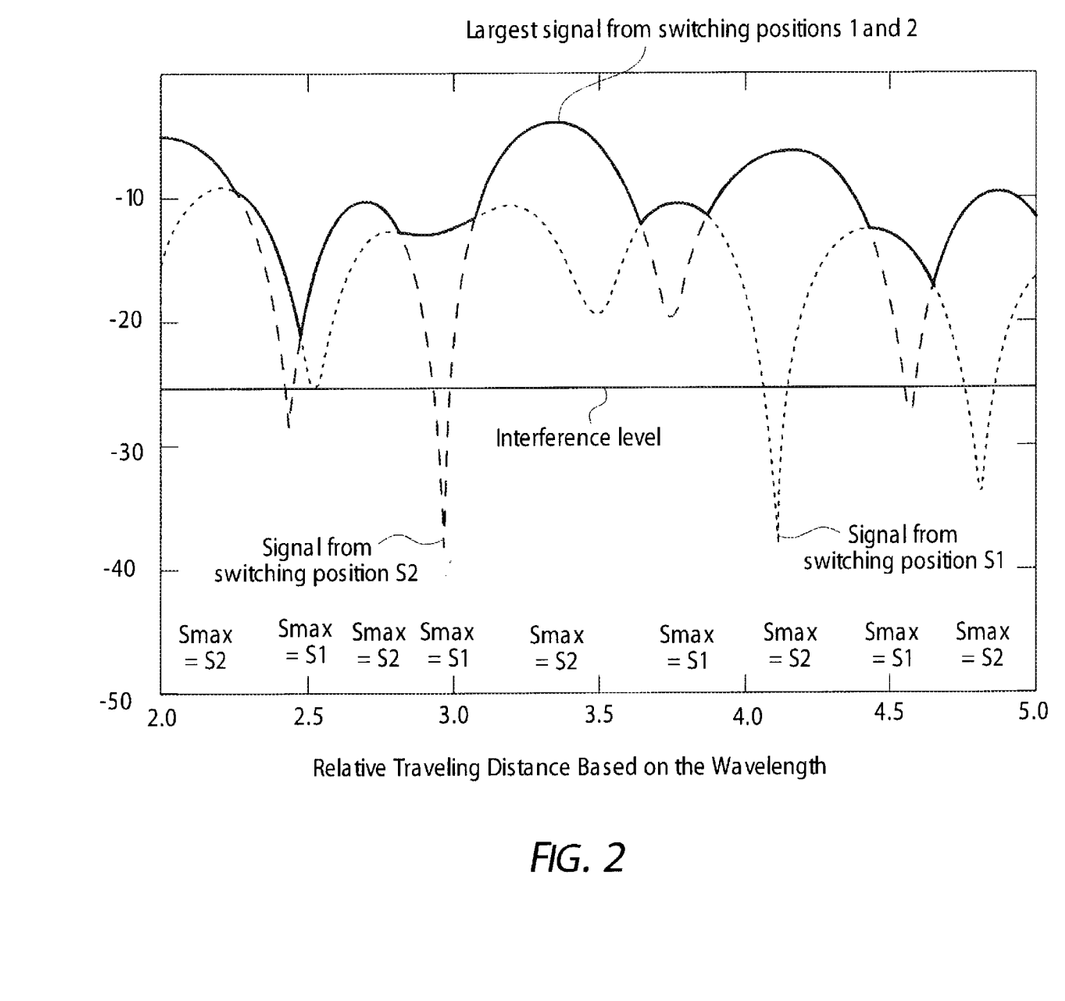
FIG. 2 shows the curve of the reception levels arising from two different switching positions.

FIG. 2 shows the basic mode of the operation by looking at received signals 5 obtained within two different switching positions S1 and S2 over the driven distance based upon the lambda wavelength of the receiving frequency. This distance is represented at an interference level that is notably below the median value of two received signals 5. Each of these two received signals 5 exhibits the know level breakdowns conditioned by the multi-way reception. Without the measures of the present invention, diversity processor 4 would then reverse to the other switching position if the interference spacing is too small for received signal 5 in the range of the level breakdowns. Thus, about four changeovers take place over the considered distance under the reception conditions shown in FIG. 2. Now, with the help of level comparison circuitry 8 in logic circuitry 2 the greater of the two received signals 5 becomes additionally available for selection as a separate maximum level switching position (Smax). This is in addition to the discreetly available switching positions S1, S2, after each of the cyclically occurring level comparison processes in the course of time interval 7 following next in each case. In an interference situation as shown in FIG. 2, the greatest received signal 5 from switching positions S1 and S2 will not trigger any activity in the diversity processor because it is notably above the interference level at any point in time. The change in switching positions is shown in FIG. 2 at the bottom. The maximum level switching position is formed in the different zones of the path or distance by such change.

Diversity processor 4 will cyclically test received signals 5 according to switching positions S1, S2, Smax during time intervals 7. During this time, diversity processor 4 will as a rule, remain in switching position Smax substantially longer than switching positions S1, and S2 because of the lower probability of the occurrence of an interference. This significantly reduces the changeover frequency. It is assumed in the representation according to FIG. 2 that the cyclically recurring time intervals 7 are selected by a few orders of magnitude shorter than the time duration required by the motor vehicle to travel a distance of one half wavelength of the received frequency f so that the time intervals cannot be recognized there in FIG. 2.

There are still advantages that can be gained by a time interval during which the motor vehicle moves on by ⅕th of the wavelength. In practical life, however, it will be deemed desirable to strive for the goal that at least 10 time intervals 7 are met with a motion or drive by one half wavelength $\lambda/2$. If "v" is the driving speed, the following may apply as the standard value for time interval 7.

$$T_i = \text{Lambda}(\lambda)/(2 \star 10 \star v)$$

The level comparison time again has to be realized at least one order of magnitude smaller than Ti. Neglecting the pure changeover times given in practical applications, the cycle time for the entire process comes to:

$$T_z = T_i + T_p$$

and the cycle frequency to:
$f_z = 1T_z$, i.e., approximated to $1/T_1$.

This means that the cycle frequency has to be selected greater than the standard quality.

$$f_{zmin} = 2 \star V_{kmh} \star f_{MHz}/100 \text{ Hertz (Hz)}.$$

In the VHF frequency range with $F_{MHz}=100$, the standard value for the minimum cycle frequency $F_{zmin}$ in Hz thus corresponds with about two times the driving speed in km/h.

With a level comparison time $6=T_p$ of about 20 microseconds, which can be realized taking into account transient processes, a pulse duration ratio or pulse duty factor of at least $$T_p T_i = 2 \star 10^{-5} \star f_{zmin},$$

and with VHF of $$T_p/T_i = 4 \star 10^{-5} \star V_{kmn},$$

which for the present example, which can be kept sufficiently low even at the highest occurring vehicle speeds.

The invention can be applied inexpensively to a great number of available switching positions. Received signal 5, according to maximum-level switching positions (Smax), is obtained by level preselection from a multitude of antenna signals because of the constantly changing level conditions on the antennas due to the multiway expansion. In this case, these antenna signals continually alternate with each other. The greater the number of available different switching positions with different received signals, the smaller the breakdowns in level in the curve or course of the received signal in the maximum-level switching position (Smax).

Diversity processor 4 should not be blocked at any time, so that an additionally provided maximum level signal is avoided with respect to the determination of an interference by diversity processor 4.

The invention also has an additional advantage in that the medium interference spacing of received signal 5 is notably enhanced according to the maximum-level switching position (Smax). Because of the preselection of the maximum level switching position (Smax) from the available switching positions, the associated received signal 5 follows the level breakdown after a far less deep maximum and is quickly replaced at high speed by a more favorable switching position, the updated Smax position, while the interference spacing remains good.

Figure 3A:
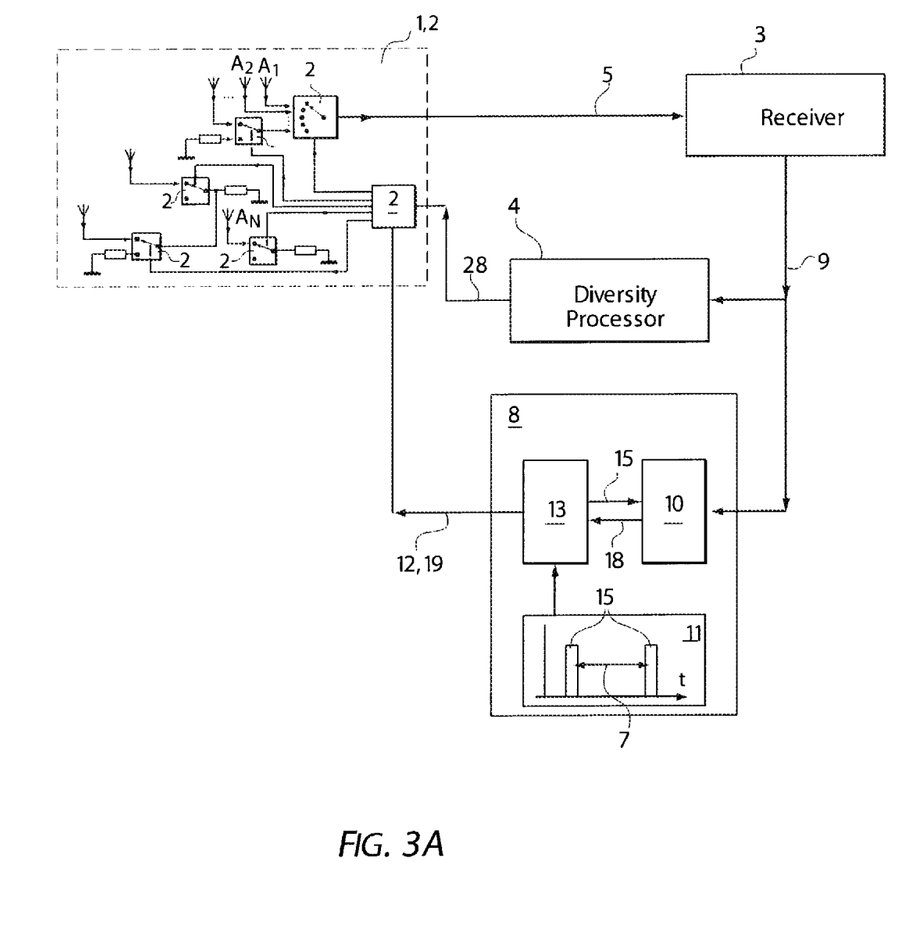
FIG. 3a shows a scanning antenna diversity system as shown in FIG. 1 further comprising a timing clock.

In another embodiment of the invention as shown in FIG. 3a the level comparison circuitry 8 is equipped with a rapidly measuring level comparator 10, and a logic circuit element 13, for determining and comparing levels of the received signal 9, which are derived from the received signal 5. These levels are present successively in terms of time, with a periodic operating interval timer 11. Upon expiration of each time interval 7, interval timer 11 triggers in the course of the level comparison time 6, (FIG. 3c) a level testing and level selecting process via the logic element 13 in level comparator 10, so that the switching state of logic circuitry 2 is reversed within the level comparison time 6 by a changeover signal 12 of the logic element 13 to a further switching position. Upon expiration of the level comparison time 6, in the logic element 13, the actual maximum level switching position (Smax) is filed as the address signal (19).

When an interference is detected by diversity processor 4, a list of switching position addresses is formed in the logic switching circuitry 2 for cyclic stepping. The address associated with the actual maximum level switching position (Smax) is added to the list as address signal 9 by transferring the latter from logic circuit element 13 to logic circuitry 2 so that the address is contained in the list in a continually updated form. This address is detected when the received signals are cyclically switched through to receiver 3.

Figure 3B:
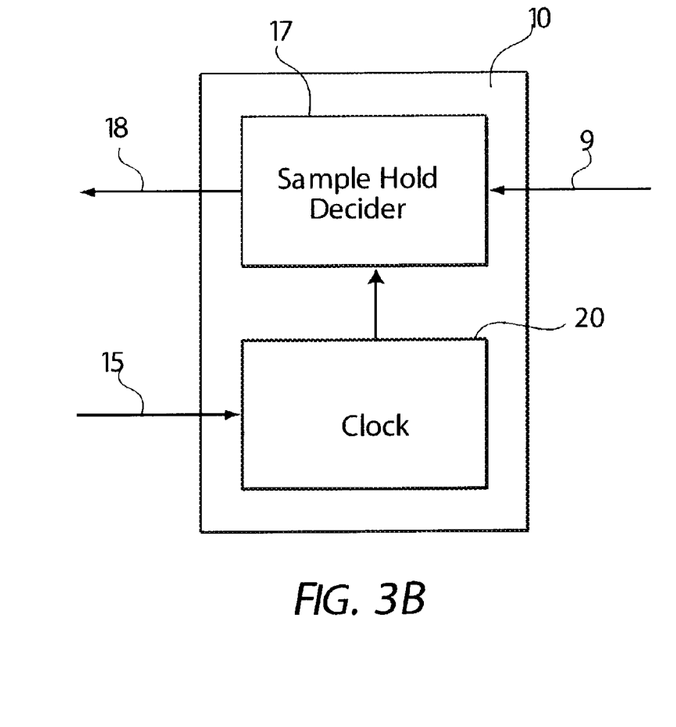
FIG. 3b shows the level comparator with a sample timer.
Figure 3C:
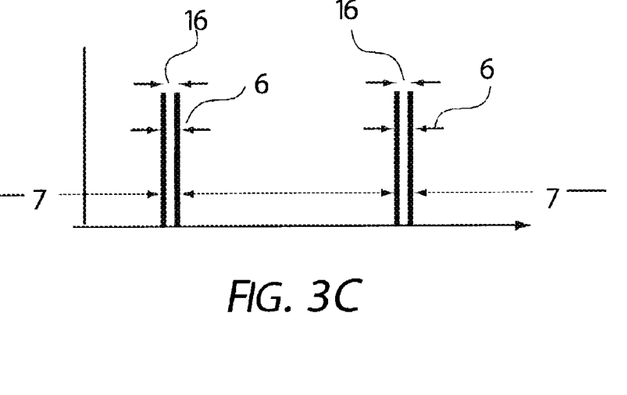
FIG. 3c shows the sample pulse for the case of level comparison.

Further developments of the level comparator 10, of the processes taking place in the course of the level comparison time 6 at the end of the time interval 7 are represented in FIGS. 3b and 3c. When the level comparison is initiated by the level comparison pulse 15 via logic element 13, logic circuitry 2 is switched to the maximum level switching position (Smax) present in the preceding level comparison as the logic signal.

Level comparator 10 contains a sample timer or clock 20 triggered via the level comparison pulse 15 and a sample and hold decider 17, which determines the level of the derived received signal 9 over a brief sample time 16, (FIG. 3c) and holds this level value to determine upon reversal of the switching position of logic circuitry 2 to another switching position during a second sample time 16, the associated level of derived received signal 9 and to advise or disclose the decision on the greater of the two determined levels of the logic element 13 as the binary signal 18.

The times required for the reversing processes are not taken into account in time diagram in FIG. 3c because they are negligible. Thus, the level comparison time 6, is practically equal to the double sample time 16. The sample time 16, is the measuring time required to determine the level at a switching position, such time taking into account transient processes.

Figure 3D:
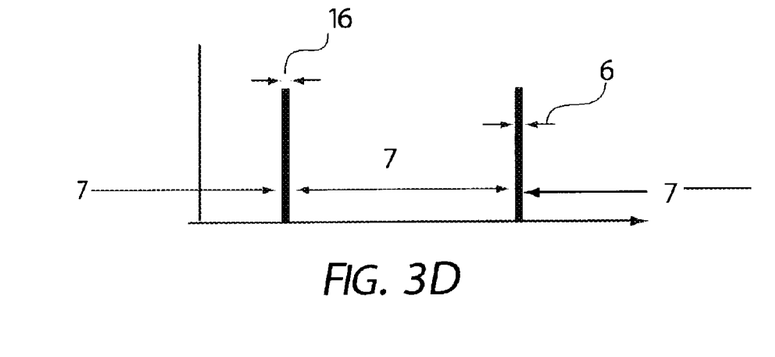
FIG. 3d shows the sample pulse for the case of level comparison of two switching positions.

To reduce level comparison time 6, the last level comparison should be held and determined during time interval 7 with the help of sample and hold decider 17. This is to file and store the associated address of the switching position of logic circuitry 2 in logic element 13. Thus, logic switching circuitry 2 is reversed to a different switching position when level comparison circuit 8 is initiated by level comparison pulse 15 via logic element 13, and sample and hold decider 17 determines the associated level of the derived received signal 9 in the course of a sample time 16 with the help of sample timer 20. The decision on the greater of the two determined levels is disclosed to logic element 13 as a binary signal 18, and the associated address of the switching position of the logic circuitry 2 is stored and updated in logic element 13. This practically reduces the level comparison time 6 to only one sample time 16 as shown in FIG. 3d.

Figure 4:
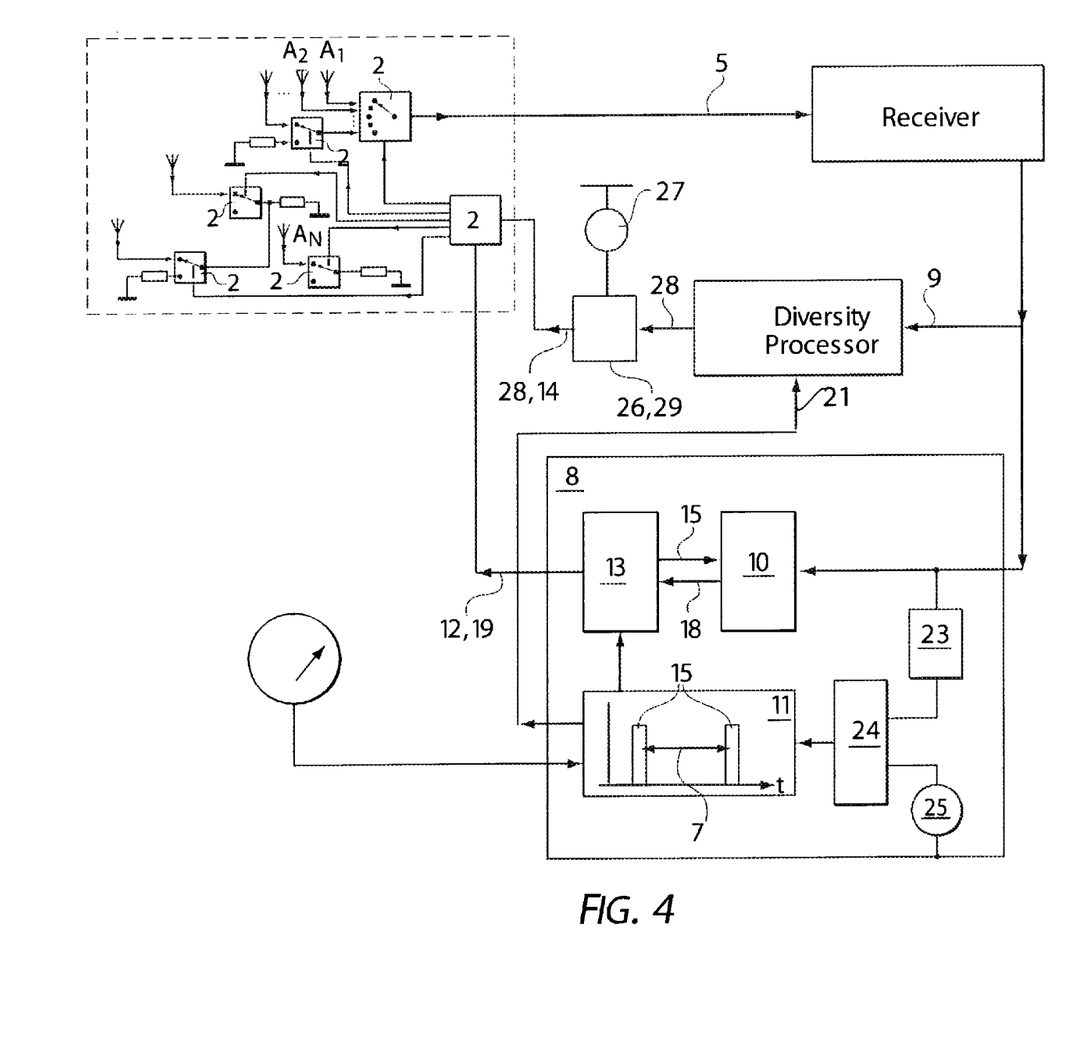
FIG. 4 shows a scanning antenna diversity system with various additional components and facilities.

FIG. 4 shows a scanning antenna diversity system that has safe prevents stepped switching caused by the level comparison process, by applying a hold signal to the hold input 21 of the diversity processor 4 during the level comparison time 6. The hold signal is derived from the level comparison pulses 15. With this embodiment, time interval 7 can be adapted to the driving speed with the help of electric tachometer signal 22 by controlling time interval 7.

When limit level 25 is exceeded by the averaged received level determined in the received signal indicator 23 in strong reception areas the level comparison pulses 15 are discontinued with the help of stop circuit 24.

The switching frequency of diversity processor 4 is limited in regions of highly disturbed received signals in all switching positions by a switch off device 29. Thus, when the pulse frequency limit value 27 determined by pulse counter 26 is exceeded, switch off device 29 prevents pulses from being passed on or transmitted to the logic circuitry. In this case, switch-off device 29 supplies the logic circuitry 2 with a shutdown signal 14 so that the maximum level switching position is adjusted or set.

Figure 5:
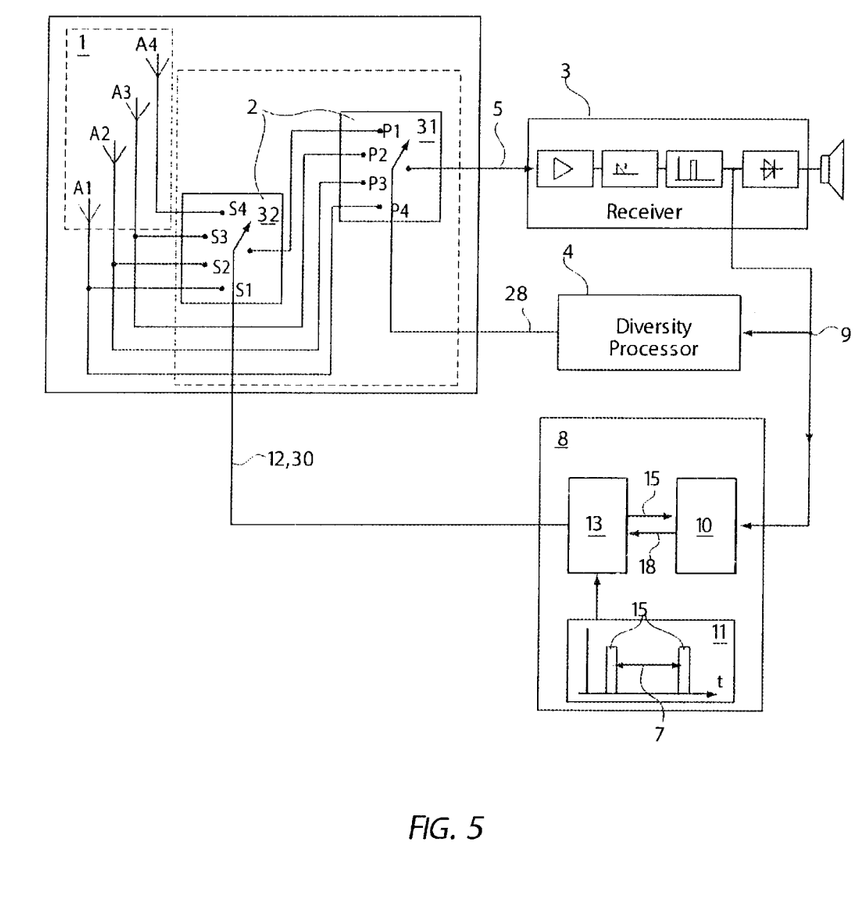
FIG. 5 shows a scanning antenna diversity system with a simple logic circuitry consisting of an electronic passing-on-switch.

FIG. 5 shows a simple embodiment of a logic circuitry 2, in which the essential portion of the logic is defined by the wiring itself. The logic circuitry consists of an electronic stepping switch 31 and an addressable electronic changeover or reversing switch 32, which has inputs coupled to antennas A1 to A4.

The received signals 5 of antennas A1, A2, A3 are discretely available at the inputs P4, P3, P2 of electronic stepping switch 31 and an addressable electronic changeover or reversing switch 32, switch 32 has inputs connected to antennas A1 to A4. According to the mode of operation described above, the received signals 5 of the antennas A1, A2, and A3 are discretely available at the inputs P4, P3, P2 of the electronic stepping switch 31. The maximum-level signal from all antennas A1 to A4 available via the maximum-level switching position Smax at the output of electronic changeover switch 30 is available at the input P1 of the electronic stepping switch 31 and is available among other antenna signals in their updated form. Because of the limited number of input connections, not all antenna signals on the electronic stepping switch 31 are discretely fed to the electronic stepping switch 31. It is obvious that by expansion of the number of the input connections of the electronic stepping switch 31 at low cost the signal antenna A4 could be discretely supplied to the stepping switch as well.

Figure 6:
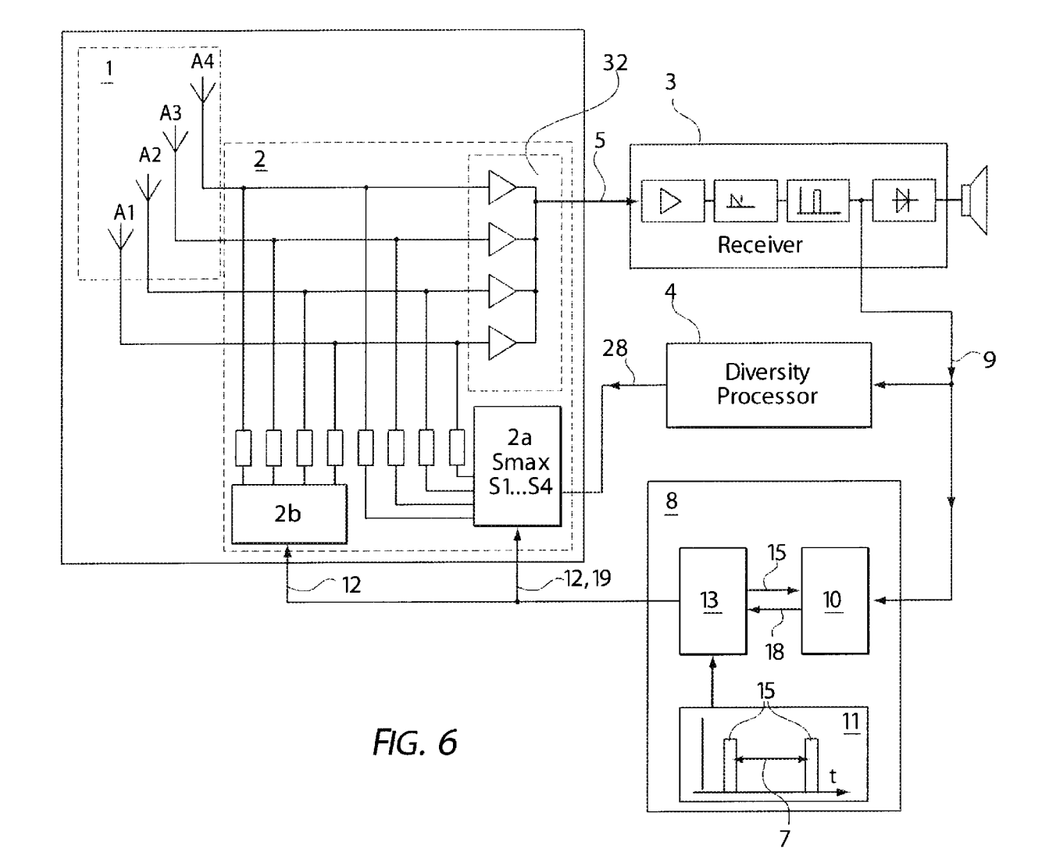
FIG. 6 shows an example of a scanning antenna diversity system with logic circuitry.

FIG. 6 shows an example of a scanning antenna diversity system with a logic circuitry 2 consisting of a multi-diode switch 32', a stepping logic element 2a, and a changeover logic element 2b. As opposed to the arrangement in FIG. 5, the list of addresses in the stepping logic element 2a is by number, one greater in number than the number of discretely fed signals. Due to the simple availability of electronic logic elements, highly effective scanning antenna diversity systems can be created in an economical manner.

All of these examples show the wide array of possibilities for creating a scanning antenna diversity system according to the operating principle of the present invention. These examples are shown primarily with the intention to explain their operating principle. In further developments of the principle, it would be advantageous if all electronic units such as the stepping logic element 2a, the changeover logic element 2b and the level comparison circuitry, and diversity processor 4, will be combined in one integral electronic unit of the system. These control processes could also be designed in many different ways.

Figure 7:
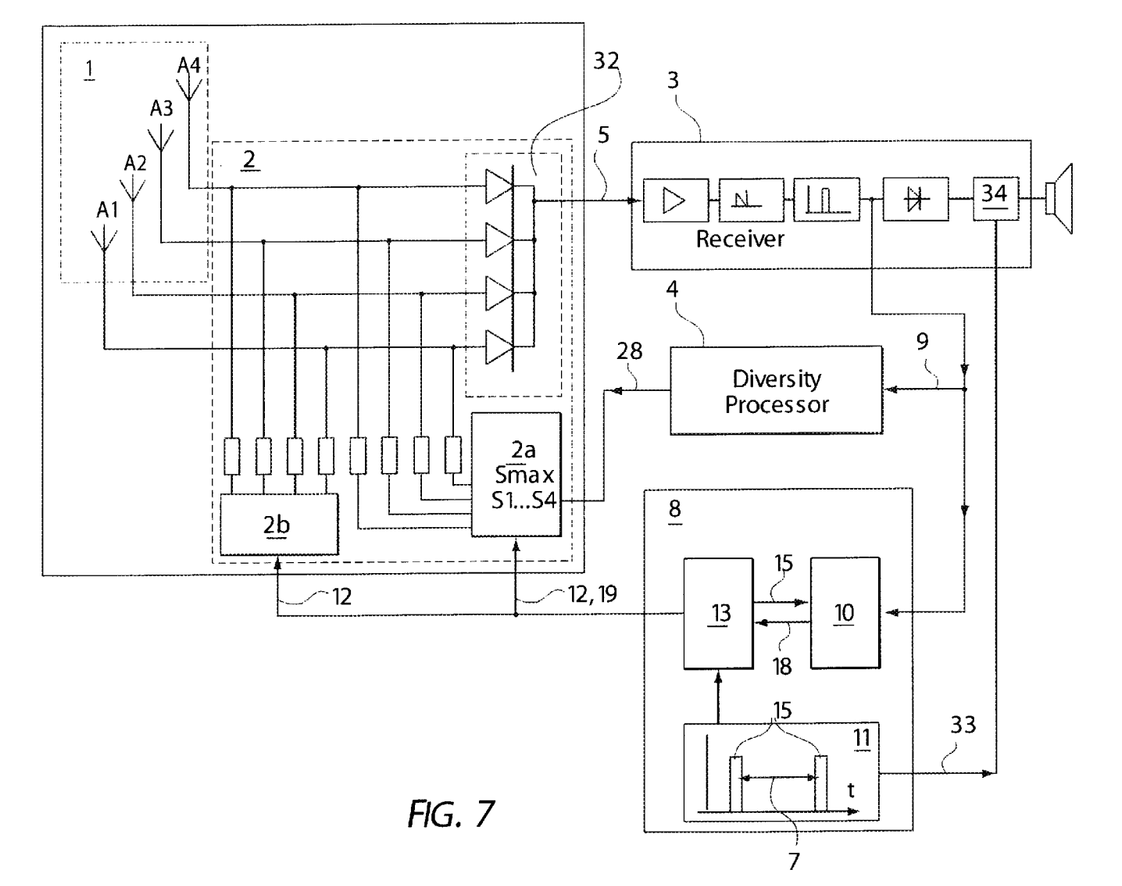
FIG. 7 shows a scanning antenna diversity system in which pulses switching to mute are formed.

In applications for high driving speeds and high reception frequencies, the level comparison times 6 of FIG. 3c may be noticeable in an interfering way because of short time intervals 7 resulting therefrom at short wavelengths. To avoid these interferences, it is possible in the embodiment of FIG. 7 to form synchronously with the level comparison times 6 mute switching pulses which are supplied to a mute circuit 34, located preferably in the low frequency component of receiver 3. The mute switching pulse 33 has to be designed with respect to its duration and the blanking depth that is achievable with it, so that switching to mute in the course of level comparison time 4, takes place so that the level comparison processes are completely inaudible.

Tests have shown that when active antennas are employed, no improved S/N curves can be obtained with the costly cophasal addition of a plurality of antenna signals, than with the selection of the greatest signal level from a group of signals as defined by the invention. These active antennas are a precondition to be satisfied for antenna diversity systems for various reasons. The present invention consequently permits the best of S/N ratios at very low expenditure.

Accordingly, while several embodiments of the present invention have been shown and described, it is to be understood that many changes and modifications may be made thereunto without departing from the spirit and scope of the invention as defined in the appended claims.

What is claimed is:

1. A scanning antenna diversity system for motor vehicles comprising:
   a) at least two antennas in a multi-antenna installation;
   b) a controllable logic circuitry coupled to said at least two antennas;
   c) a receiver coupled to said logic circuitry for receiving a received signal;
   d) a diversity processor coupled to and controlled by said receiver, said diversity processor producing a derived received signal from said first received signal, said diversity processor stepping said logic circuitry to another switching position during the presence of reception interference, wherein to produce a set of the shortest possible comparison times, said times are initiated in cyclic repetition upon expiration of a previous longer time interval; and
   e) a plurality of level comparison circuitry for detecting said derived received signal and determining a maximum level switching position associated with the greater actual derived received signal, and selecting a sufficiently short level comparison time without any audible impairment of reception.

2. The scanning antenna diversity system as in claim 1, wherein said level comparison time interval is selected sufficiently short so that the movement of the vehicle during the level comparison time interval does not exceed the distance $\lambda/5$ and the level comparison time is selected in a microsecond range.

3. The scanning antenna diversity system according to claim 1, wherein said logic circuitry is designed to determine the actual maximum level switching position by comparing two switching positions based upon the greater level of a pair of two associated received signals during said level comparison time interval.

4. The scanning antenna diversity system according to claim 1, wherein said set of level comparison circuitry comprises a level comparator and a logic element wherein upon expiration of each time interval, a changeover signal instructs said logic circuitry to move to another switching position based upon the maximum level switching position determined from the reception signal, and said logic element establishes this as an address signal so that when said diversity processor detects an interference, said logic circuitry has a list of switching position addresses for cyclic stepping wherein the actual maximum level switching position is contained in said list as the continually updated address signal by transferring said address from the logic element to the logic circuitry so that said address is detected when the received signals are cyclically switched through to the receiver.

5. The scanning antenna diversity system according to claim 4, wherein said level comparator further comprises a sample and hold decider, so that said sample and hold decider determines over a short sample time the associated level of the derived received signal and discloses the decision on the greater of the two determined levels to the logic circuitry element as a binary signal.

6. The scanning antenna diversity system according to claim 4, wherein said level comparator further comprises a sample and hold decider for holding the greater level value from the last level comparison for the time interval so that the associated address of the logic circuitry switching position is stored in said logic element so that upon initiation of the level comparison by the level comparison pulse via the logic element, the logic circuitry is reversed to another switching position, wherein, said sample and hold decider determines during a sample time with a sample timer, the associated level of derived received signal and discloses the decision on the greater of the two determined levels to the logic element as a binary signal, and the associated address of the switching position of the logic circuitry is updated and stored in said logic element.

7. The scanning antenna diversity system according to claim 1, wherein said diversity processor further comprises a holding input which upon application of a holding signal blocks stepping of said logic circuitry during the presence of an interference in said derived received signal, wherein said holding signal is applied during said comparison time to prevent further stepping caused by said level comparison circuit.

8. The scanning antenna diversity system according to claim 1, wherein said time interval is changed depending on driving speed so that its reciprocal is adjusted proportionately to the driving speed of the standard value.

9. The scanning antenna diversity system according to claim 8, wherein said time interval is set depending on the electric tachometer signal of the vehicle.

10. The scanning antenna diversity system according to claim 1, wherein said level comparison circuit further comprises a received signal level indicator for determining the averaged received level and a stop circuit, for stopping said level comparison pulses when a limit level is exceeded in reception areas having strong signals.

11. The scanning antenna diversity system according to claim 1, further comprising a pulse counter connected to said diversity processor and said logic circuitry said pulse counter for determining the switching frequency of the diversity processor so that when the pulse frequency limit value is exceeded, the stepping pulses of said diversity processor are prevented from being passed on to said logic circuitry via a shutdown device, wherein said shutdown device transmits a setting signal to said logic circuitry to adjust the maximum level switching position (Smax).

12. The scanning antenna diversity system according to claim 1, wherein said logic circuitry, comprises a combination of multi-pole electronic stepping switch, and a multipole electronic changeover switch wherein said multipole electronic stepping switch is triggered by a stepping pulse on the output of said diversity processor which triggers stepping by one switching position upon the appearance of a stepping pulse on the output of the diversity processor, and wherein said multi-pole electronic changeover switch is coupled to said antennas so that the electronic changeover switch initiated by the level comparison pulses via the logic element is controlled via the logic circuit element for the purpose of level comparison via the reversing signal so the maximum level switching position (Smax) is provided during the time intervals so that the associated maximum level signal is supplied to one of said input connections of the electronic stepping switch, and the remaining input connections of said electronic stepping switch are fed with discrete signals from the antennas.

13. The scanning antenna diversity system according to claim 11, wherein said logic circuitry further comprises a multi diode switch so that each signal from said antennas is switched through to the input of said receiver by alternatively activating one diode, and further comprising a reversing logic circuit and a stepping logic circuit, for controlling the permeability of the diodes so that the stepping logic, the address list of the signals from said antennas is filled expanded by the address signal of the maximum-level switching position (Smax) by controlling with the address signal that upon appearance of a stepping pulse during a time interval on the output of the diversity processor, the address list is serviced by a further position by activating the associated diode; and wherein upon appearance of the changeover signal said slipping logic element prevents said diodes in the multi-diode switch from activating.

14. The scanning antenna diversity system according to claim 13, wherein said level comparison circuitry provides a mute switching pulse so that said pulse switching to mute is supplied to a mute circuit disposed in the low-frequency component of said receiver wherein with respect to its duration and blanking depth achieved by said pulse, said pulse is designed so that switching to mute takes place during the level comparison time so that the input of the level comparison circuitry is completely inaudible.

* * * * *